US005675442A

United States Patent [19]

Parks

[11] Patent Number: 5,675,442
[45] Date of Patent: Oct. 7, 1997

[54] MICROSCOPE LENS GUIDE SYSTEM

[75] Inventor: Scott Parks, Cheektowaga, N.Y.

[73] Assignee: Leica Inc., Depew, N.Y.

[21] Appl. No.: 644,677

[22] Filed: May 7, 1996

Related U.S. Application Data

[63] Continuation of Ser. No. 182,271, Jan. 14, 1994, abandoned.

[51] Int. Cl.⁶ .......................... G02B 21/00; G02B 15/14
[52] U.S. Cl. ................... 359/701; 359/368; 359/380; 359/694
[58] Field of Search ......................... 359/376, 380, 359/368, 694–706

[56] References Cited

U.S. PATENT DOCUMENTS

| 3,060,801 | 10/1962 | Boughton et al. | 359/700 |
|---|---|---|---|
| 3,166,629 | 1/1965 | Walter | 359/380 |
| 3,405,991 | 10/1968 | Seedhouse | 359/376 |
| 3,510,202 | 5/1970 | Boughton | 359/700 |
| 4,518,223 | 5/1985 | Waters | 359/380 |
| 4,650,296 | 3/1987 | Tsuchiya | 359/380 |
| 4,690,519 | 9/1987 | Clark et al. | 359/376 |
| 4,740,064 | 4/1988 | Kono et al. | 359/697 |
| 5,161,066 | 11/1992 | Tanaka et al. | 359/694 |
| 5,208,921 | 5/1993 | Nicoll | 4/286 |
| 5,241,422 | 8/1993 | Shimada et al. | 359/700 |
| 5,272,567 | 12/1993 | Inoue | 359/689 |
| 5,291,335 | 3/1994 | Ogino | 359/694 |
| 5,515,210 | 5/1996 | Devenyi | 359/694 |
| 5,587,846 | 12/1996 | Miyano et al. | 359/698 |

Primary Examiner—Thong Nguyen
Attorney, Agent, or Firm—Bean, Kauffman & Snyder

[57] ABSTRACT

A microscope lens guide system is disclosed wherein a plurality of lens carriers are magnetically biased to guide rods to ensure rectilinear motion of lenses held by the carriers along an optical axis of the microscope. In a first embodiment, each lens carrier includes a first portion having a passage for slidably receiving a guide rod and a second portion having a magnet for biasing the second portion for engagement with another guide rod formed of magnetic material. In a second embodiment, additional magnets are provided to bias the passage for engagement with the guide rod received by the passage.

21 Claims, 3 Drawing Sheets

MICROSCOPE LENS GUIDE SYSTEM

This application is a continuation of application Ser. No. 08/182,271, filed Jun. 14, 1994 now abandoned.

BACKGROUND OF THE INVENTION

Prior art microscopes having continuously variable magnification systems typically utilize a zoom adjustment mechanism whereby a pair of lenses may be moved relative to each other along an optical axis of the microscope. Where the microscope is a stereomicroscope, complementary (i.e. left and right) lens pairs may be moved along converging optical axes by the zoom adjustment mechanism. In several prior art stereomicroscopes, the lens pairs are held by lens cell carriers which are mounted for movement along guide rods supported by a frame. Movement of the carriers may be accomplished using dual cam slots formed in the guide rods or in a central cam shaft and coupled to a cam follower on each carrier, whereby rotation of the cammed rod or rods via an adjustment knob connected to such rod or rods by a gear train causes the carriers to move along the guide rods. Examples of such prior art devices are disclosed in U.S. Pat. Nos. 3,060,801 and 3,510,202 to Boughton, and U.S. Pat. No. 3,405,991 to Seedhouse. An alternate mechanism for movement of the lens carriers employing a crank and linkage configuration is disclosed in commonly owned U.S. Pat. No. 4,690,519 to Clark et al.

In order that the lenses of a microscope remain aligned along the optical axis during zoom adjustment motion, it is desirable to mount the lens carriers on a first guide rod and bias a portion of each carrier for engagement with a second guide rod to constrain rotation of the carrier relative to the first guide rod. Typically, biasing means comprises a mechanical spring having one end mounted on the lens carrier and another end mounted on a separate component movable with the carrier, such as a complementary lens carrier in a stereomicroscope. FIG. 1 illustrates a prior art construction disclosed in U.S. Pat. No. 4,690,519, wherein a complementary pair of lens carriers 1a and 1b are mounted on guide rods 2 and 3, respectively, and a horseshoe spring 4 extending between the carriers exerts a biasing force on each carrier such that carrier arm portions 5 and 6 engage the guide rod on which the complementary carrier is mounted, thereby limiting rotational motion of the carriers.

SUMMARY OF THE INVENTION

The present invention generally relates to microscopes, and more particularly to lens guide systems for microscopes utilizing magnetic biasing means.

It is an object of the present invention to provide an improved lens guide system for a microscope wherein lens carriers of the system are biased for engagement with a guide rod using magnetic biasing means.

Another object of the present invention is to provide a microscope lens guide system with biasing means which exerts a constant force on the lens carriers of the microscope through their entire range of travel along an optical axis.

A further object of the present invention is to provide a microscope with a lens guide system which is less reliant on mechanical biasing means, thereby making the microscope simpler to assemble and more durable than prior art microscopes.

In accordance with the present invention, a variable power microscope having zoom adjustment means for moving a plurality of lens carriers of the microscope along guide rods is provided with magnetic means for biasing each carrier for engagement with a guide rod to ensure necessary rectilinear motion of the zoom lenses along an optical axis of the microscope.

In a first embodiment stereomicroscope, a frame supports two complementary pairs of parallel guide rods having upper and lower lens carriers slidably connected thereto for motion along converging optical axes of the stereomicroscope by zoom adjustment means. Each lens carrier comprises a first portion having a passage, preferably a through hole, for slidably receiving a guide rod and a second portion having a slot formed therein and a magnet proximate the slot for magnetically biasing an abutment surface of the slot for engagement with another guide rod formed of a magnetic material.

In a second embodiment stereomicroscope similar to the first embodiment, additional magnets are provided proximate the passage in the first portion of the lens carrier for biasing the passage for engagement with the guide rod received within the passage. The passage in the second embodiment is preferably in the form of a V-shaped groove.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
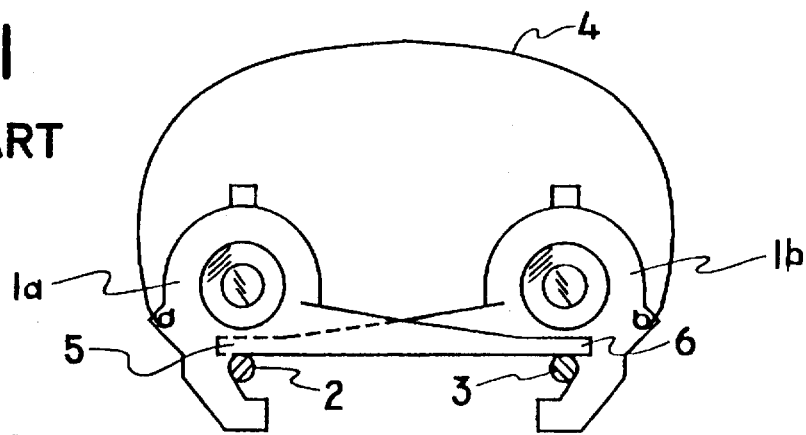
FIG. 1 is a top view illustrating a prior art lens guide system.
Figure 2:
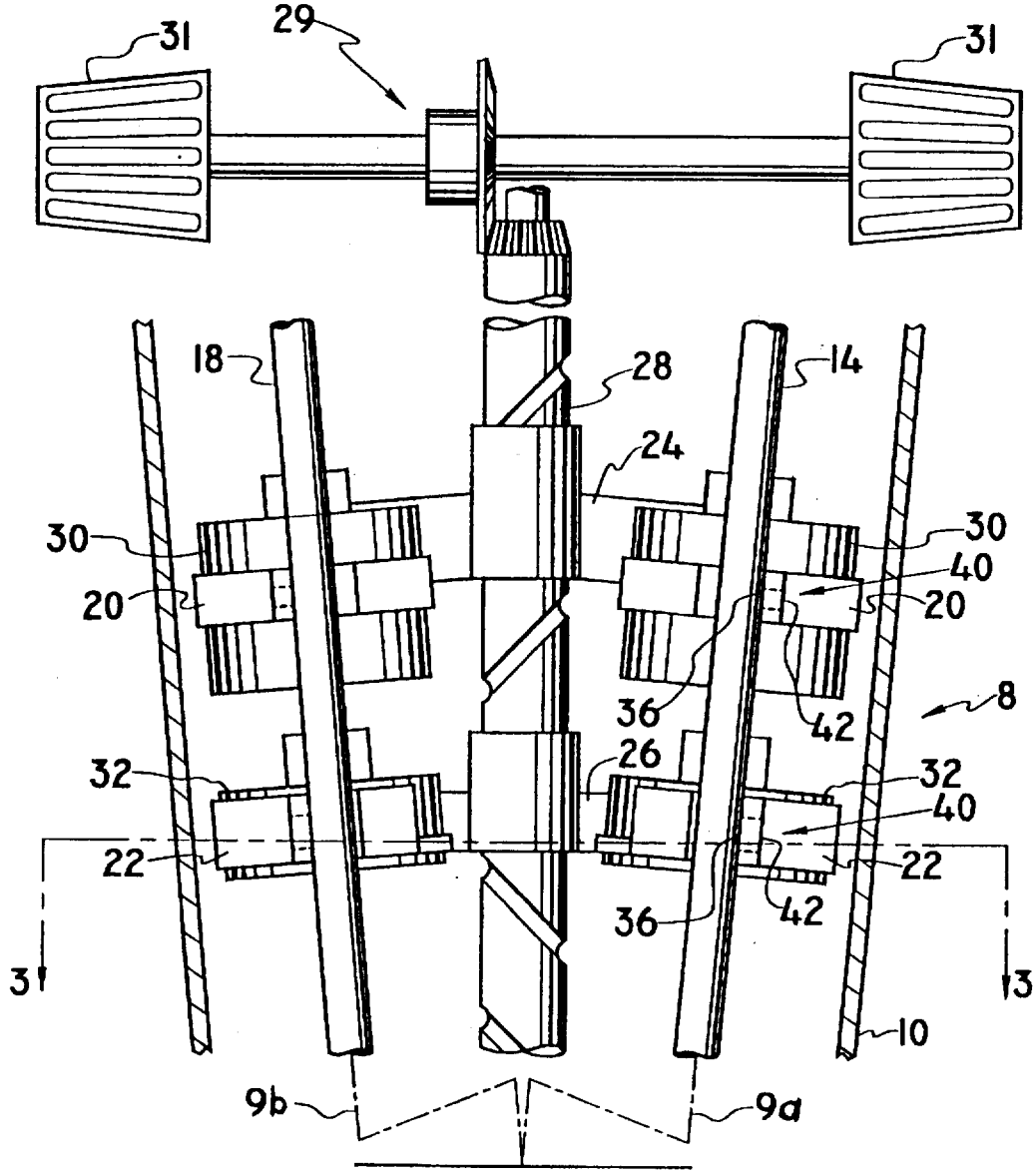
FIG. 2 is a rear view of a microscope lens guide system incorporating magnetically biased lens carriers in accordance with a first embodiment of the present invention.
Figure 3:
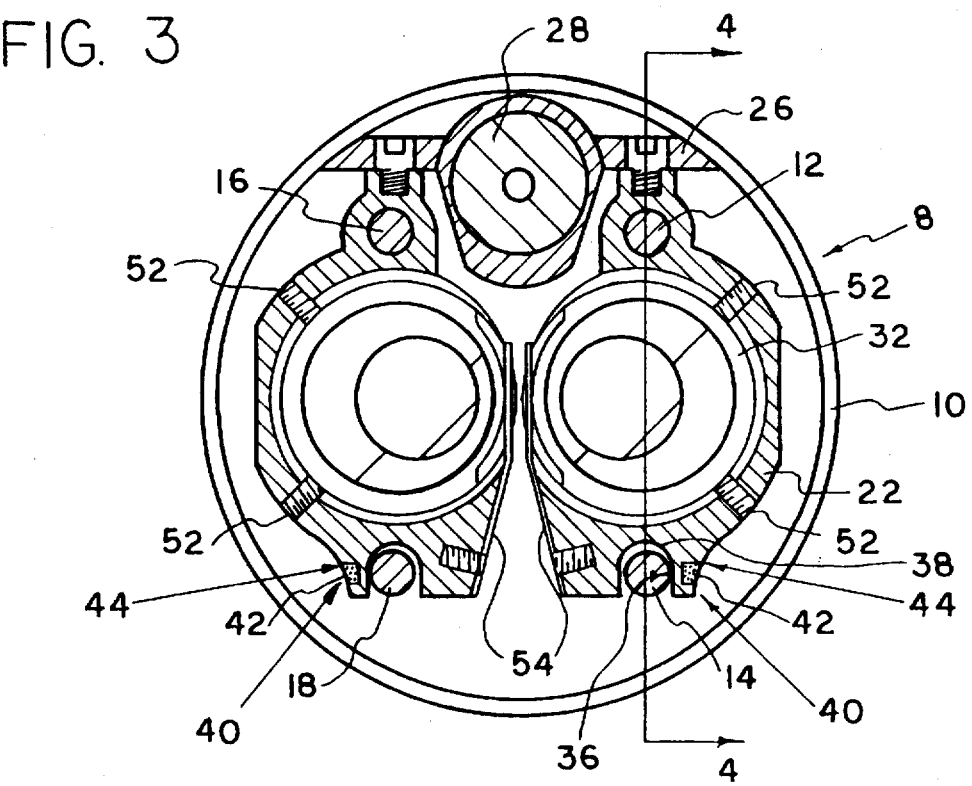
FIG. 3 is a sectional view taken along line 3—3 in FIG. 2.
Figure 4:
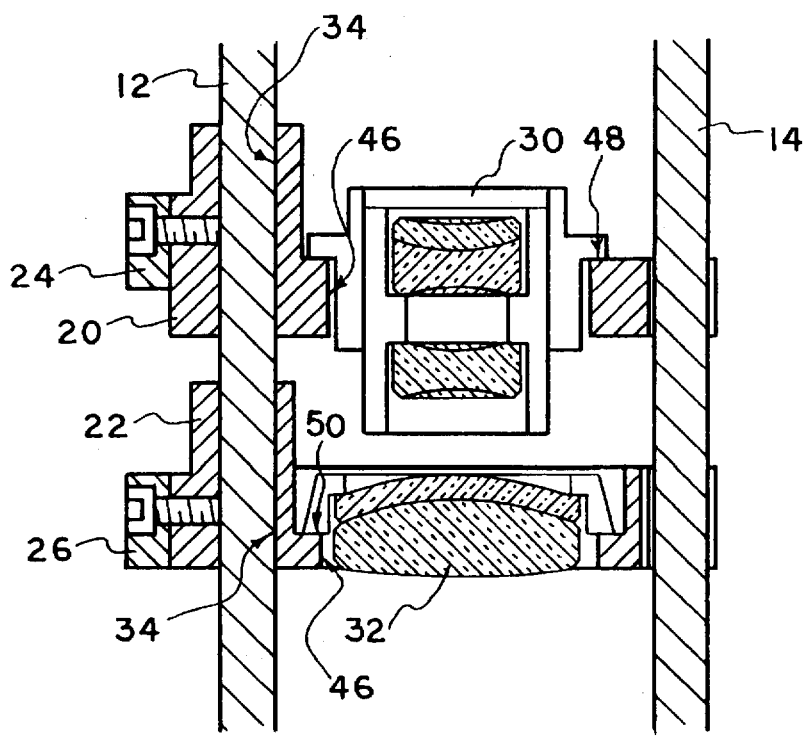
FIG. 4 is a sectional view taken along line 4—4 in FIG. 3.

Referring to FIGS. 2–4, a first embodiment stereomicroscope 8 having converging optical axes 9a and 9b is shown as generally including a frame 10 for supporting a first pair of parallel guide rods 12 and 14 and a second pair of parallel guide rods 16 and 18, each pair of guide rods having an upper lens carrier 20 and a lower lens carrier 22 slidably connected thereto. Upper lens carriers 20 are connected to an upper cam follower 24 and lower lens carriers 22 are connected to a lower cam follower 26, with the upper and lower cam followers being mounted for cooperation with dual cam shaft 28. Zoom adjustment means 29 is provided for rotating cam shaft 28 to move upper and lower lens carriers 20 and 22 in a predetermined manner in relation to each other to continuously vary the magnification power of stereomicroscope 8. Alternatively, zoom adjustment means may include a crank and link mechanism, such as that taught by commonly owned U.S. Pat. No. 4,690,519 to Clark et al.

The purpose of guide rods 12 and 14 and lens carriers 20 and 22 connected thereto is to ensure necessary rectilinear motion of an upper lens 30 and a lower lens 32 along optical axis 9a when the zoom is adjusted. Guide rods 16 and 18 serve a similar and complementary purpose with respect to optical axis 9b, however the invention is described below solely as it relates to optical axis 9a for sake of simplicity.

In order to ensure the necessary rectilinear motion, guide rods 12 and 14 are secured in a conventional fashion at each end thereof to frame 10, such that the guide rods are parallel to each other and to optical axis 9a. Lens carriers 20 and 22 are provided with a passage 34 through a first portion thereof for receiving guide rod 12. In the first embodiment, passage 34 is an elongated through hole preferably formed to close tolerances to accommodate guide rod 12 in surface-to-surface fit. Elongation of passage 34 is desirable to provide a suitably large length-to-diameter ratio, thereby allowing lens carriers 20 and 22 to slide along guide rod 12 with minimal wobble, i.e. movement along or rotation about a transverse axis of guide rod 12 due to slight clearance between guide rod 12 and the inner surface of passage 34.

In accordance with the present invention, upper and lower lens carriers 20 and 22 each include an abutment surface 36 at a second portion thereof, such as a surface of a slot 38 formed therein, and magnetic biasing means 40 for biasing abutment surface 36 for engagement with guide rod 14 to prevent rotation of the lens carrier about the longitudinal axis of guide rod 12. Biasing means 40 preferably comprises a magnet 42 held within a recess 44 proximate abutment surface 36 for magnetic attraction to guide rod 14, which is formed of a suitable magnetic material, i.e. a material to which magnet 42 is magnetically attracted, such as a magnetic stainless steel. Magnet 42 is completely supported by the lens carrier which it serves to bias, enabling the lens carrier to function independently and without a separate component for mounting the other end of a mechanical spring, as required by the prior art. It may be appreciated that biasing means 40 of the present invention reduces the need for mechanical springs as employed by the prior art, thereby simplifying assembly of the instrument and improving its reliability and durability. An additional advantage of biasing means 40 is that it exerts a constant biasing force for engaging the lens carriers with guide rod 14 throughout the entire range of travel of each lens carrier along guide rods 12 and 14, resulting in a more uniform force to be applied by a user to zoom adjustment means 29, which may include a rotational knob 31. With prior art constructions having mechanical springs supported by complementary lens carriers, the biasing force exerted by the mechanical spring is non-uniform due to converging and diverging motion of the complementary lens carriers relative to each other.

Upper and lower lens carriers 20 and 22 additionally include view openings 46 through a third portion thereof, and support surfaces 48 and 50 for supporting upper and lower lenses 30 and 32, respectively. The lenses may be located and secured within view openings 46 by suitable means, which may include radially adjustable set screws 52 provided in the carrier and a retainer spring 54 attached to the carrier.

Figure 5:
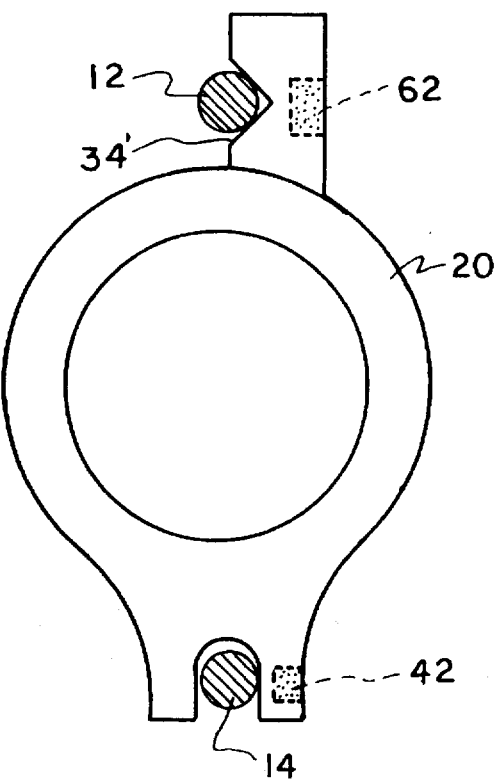
FIG. 5 is a top view of a lens carrier and guide rods formed in accordance with a second embodiment of the present invention.
Figure 6:
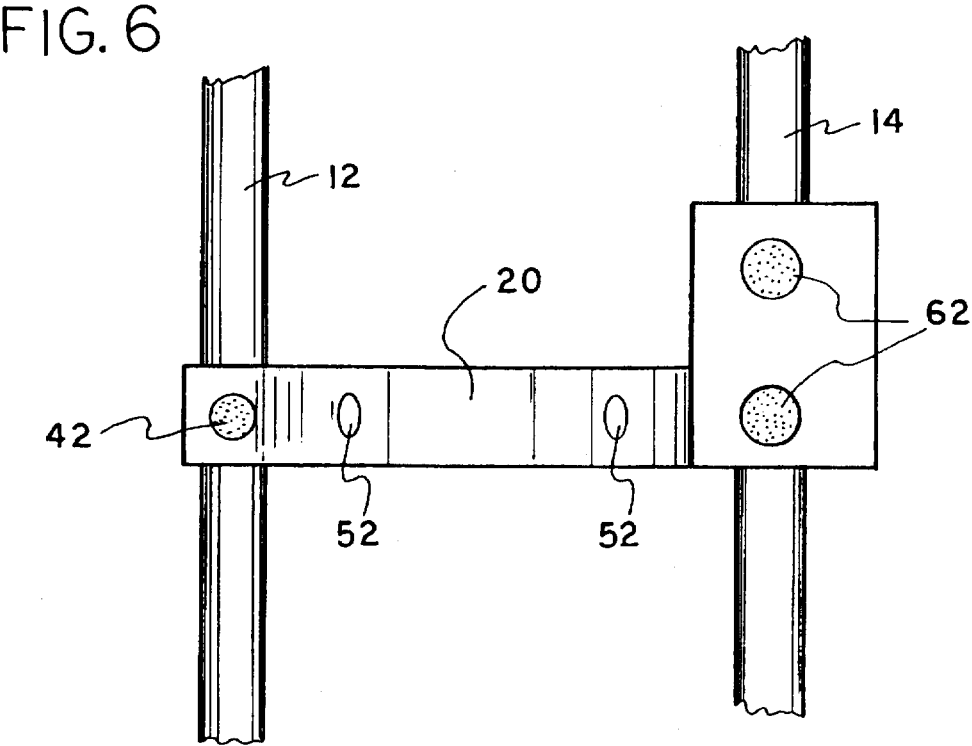
FIG. 6 is a side view thereof.

FIGS. 5 and 6 illustrate a second embodiment of the present invention wherein guide rod 12 is slidably held within a passage 34', preferably in the form of a V-shaped groove through upper lens carrier 20, by a pair of magnets 62 situated proximate magnetic guide rod 12 and spaced in the direction of the longitudinal axis of guide rod 12. A similar arrangement may be employed for each lens carrier, including lower lens carrier 22. Thus, in the second embodiment, magnets are used proximate both guide rods for biasing the lens carriers for engagement with the guide rods, thereby minimizing wobble and preventing rotation of the lens carriers to provide smooth rectilinear motion of the lens carriers along the guide rods.

Although only certain preferred forms of the present invention have been shown and described in detail, other forms are possible and changes and substitutions may be made therein, for instance substituting magnetic repulsion for magnetic attraction as a biasing means, without departing from the spirit of the invention as defined in the appended claims.

What is claimed is:

1. A variable power optical instrument comprising:
   (a) support means;
   (b) a pair of elongated magnetic guide rods secured to said support means;
   (c) a plurality of lens carriers each adapted to support a lens and position said lens along an optical axis of said instrument, each said carrier having a first portion slidably connected to one of said guide rods and a second portion magnetically biased for continuous engagement with another of said guide rods to prevent rotation of said carrier about a longitudinal axis of said one guide rod as said carrier is moved along said optical axis; and
   (d) zoom adjustment means connected to said support means for moving said carriers along said optical axis.

2. An instrument according to claim 1, wherein said second portion includes a magnet for biasing said second portion for engagement with said another guide rod.

3. An instrument according to claim 2, further comprising a second optical axis which converges with said optical axis and a plurality of said carriers associated with said second optical axis.

4. An instrument according to claim 3, further comprising a second pair of said guide rods for guiding said carriers along said second optical axis.

5. An instrument according to claim 4, wherein said zoom adjustment means includes a cam shaft.

6. An instrument according to claim 5, wherein said guide rods are formed of magnetic stainless steel.

7. An instrument according to claim 2, wherein said first portion includes a passage for slidably receiving said guide rod and at least one magnet proximate said passage for biasing said passage for engagement with said guide rod.

8. An instrument according to claim 7, further comprising a second optical axis which converges with said optical axis and a plurality of said carriers associated with said second optical axis.

9. An instrument according to claim 8, further comprising a second pair of said guide rods for guiding said carriers along said second optical axis.

10. An instrument according to claim 9, wherein said zoom adjustment means includes a cam shaft.

11. An instrument according to claim 10, wherein said guide rods are formed of magnetic stainless steel.

12. An instrument according to claim 1, wherein said guide rods are formed of magnetic stainless steel.

13. A lens carrier for use in a variable power optical instrument comprising: a first portion having a passage for slidably receiving a first guide rod; a second portion having a slot for slidably receiving a second guide rod with clearance between a pair of opposing surfaces of said slot, an abutment surface corresponding to one of said opposing surfaces of said slot for continuously engaging said second guide rod and a magnet associated with said abutment surface for continuously biasing said abutment surface against said second guide rod, another of said pair of opposing surfaces having no magnet associated therewith; and a third portion having a view opening therethrough and means to support and locate a lens cell within said view opening.

14. A lens carrier according to claim 13, wherein said passage is an elongated through hole.

15. A lens carrier according to claim 13, wherein said second portion includes a recess for holding said magnet.

16. A lens carrier according to claim 13, wherein said abutment surface is biased for engagement with said second guide rod solely by said magnet.

17. A lens carrier according to claim 13, wherein said first portion includes at least one magnet proximate said passage for biasing said passage for engagement with said first guide rod.

18. A lens carrier according to claim 17, wherein said first portion includes a pair of magnets spaced in the axial direction of said passage.

19. A lens carrier according to claim 17, wherein said passage is a V-shaped groove.

20. A lens carrier according to claim 19, wherein said first portion includes a pair of magnets spaced in the axial direction of said groove.

21. A lens carrier according to claim 20, wherein said passage is biased for engagement with said first guide rod solely by said pair of magnets.

* * * * *